(Model.)

C. RICHARDS.
ANTI FRICTION BEARING AND BUSHING.

No. 307,333. Patented Oct. 28, 1884.

WITNESSES:
J. Snowden Bell
R. H. Whittlesey

INVENTOR,
Charles Richards,
BY George H. Christy
ATTORNEY.

UNITED STATES PATENT OFFICE.

CHARLES RICHARDS, OF CLEVELAND, OHIO, ASSIGNOR OF ONE-HALF TO WILLIAM JANDUS, OF SAME PLACE.

ANTI-FRICTION BEARING AND BUSHING.

SPECIFICATION forming part of Letters Patent No. 307,333, dated October 28, 1884.

Application filed December 17, 1883. (Model.)

*To all whom it may concern:*

Be it known that I, CHARLES RICHARDS, a citizen of the United States, residing at Cleveland, in the county of Cuyahoga and State of Ohio, have invented certain new and useful Improvements in Anti-Friction Bearings and Bushings, of which improvements the following is a specification.

My invention relates to bearings of the class in which metals of sufficient strength and hardness to provide proper support to the moving members which bear upon them, and to be exempt from undue wear, are combined with a material possessing lubricating properties—as graphite or compounds thereof—in order to provide a self-lubricating bearing-surface.

The object of my invention is to simplify and economize the construction of bearings of such character, and to enable the lubricating material to be conveniently and securely located and maintained in position and disposed as desired over the area of bearing-surface.

To this end my improvements consist in a metallic bearing-plate having a series of open-sided recesses or depressions in its bearing-face adapted to receive a lubricant, and projections on its opposite face adapted to engage the metal of an inclosing casing or support; also, in the combination of a bearing-plate, as specified, a filling of lubricating material inserted in the recesses thereof, and a casing; also, in the combination of two or more bearing-plates, as specified, and a filling of lubricating material inserted in the recesses thereof; also, in the combination of two or more bearing-plates, as specified, a filling of lubricating material, and a casing inclosing and uniting the bearing-plates.

The improvements claimed are hereinafter more fully set forth.

Figure 1:
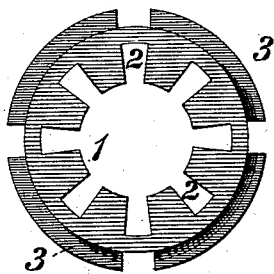
Figure 2:
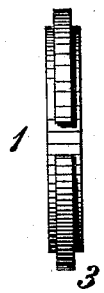
Figure 3:
Figure 4:
Figure 5:
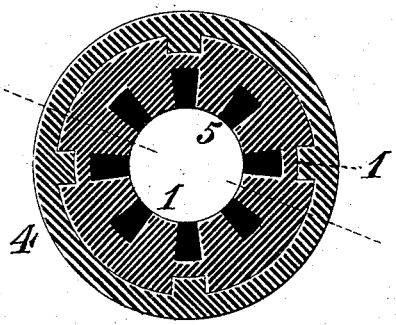
Figure 6:
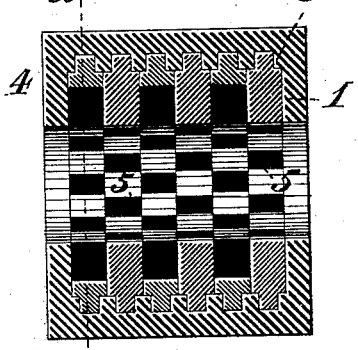
Figure 7:
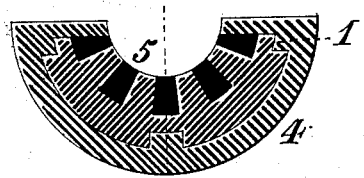

In the accompanying drawings, Figure 1 is an end view in elevation of a continuous bearing-plate embodying my invention; Fig. 2, a side view of the same; Fig. 3, an end view in elevation of a segmental bearing-plate; Fig. 4, a side view of the same; Fig. 5, a transverse section, at the line *x x* of Fig. 6, through a bearing or bushing having a series of bearing-plates similar to those of Figs. 1 and 2; Fig. 6, an axial section through the same; Fig. 7, a transverse section, at the line *y y* of Fig. 8, through a bearing or bushing having a series of bearing-plates similar to those of Figs. 3 and 4; and Fig. 8, an axial section through the same.

To carry out my invention I form of any suitable metal of sufficient strength and hardness to constitute the bearing or support of a moving member in a mechanical structure a bearing-plate, 1, having an inner bearing-surface conforming throughout to the surface of the shaft, stem, or other member with which it is designed to be in contact when in use. A series of recesses or slots, 2, is formed in the bearing-surface of the plate 1, said recesses extending from the bearing-surface toward the periphery of the plate and across the plate, thereby presenting a clear opening on three sides—to wit, the bearing-surface and the two sides of the plate.

The recesses 2, which are designed to receive a filling of solid lubricating material in a compressed condition—as, for example, graphite—may be of any desired form and number, being preferably beveled or tapered inwardly, as shown, in order to more firmly retain the filling placed therein, and the insertion and compression to any desired degree of the lubricant in the recesses can be readily and perfectly accomplished, as the recesses are open and unobstructed on their tops and sides. One or more ribs or projections, 3, are formed upon the outer surface of the plate 1; or, as a mechanical equivalent thereof, depressions or indentations may be formed in said surfaces, in order to enable the plate to be engaged and firmly held by the metal of a casing or support, 4, cast around it, said casing serving to close the sides of the recesses 2 and form the lateral boundary of the lubricant therein, and providing means for attaching the plate 1 to the member of the machine which it carries or on which it is fixed, as the case may be, as also for uniting a series of two or more plates in a bearing or bushing, as presently to be described.

The bearing-plate shown in Figs. 3 and 4, which is designed for open or longitudinally split or divided bearings or bushings, differs from that of Figs. 1 and 2 only in the particular of being segmental—in this instance semicircular—instead of continuous, and is therefore laterally insertible on and removable from the member which fits against its bearing-surface, while in the former case insertion and removal can be effected longitudinally only.

In the construction of bearings and bushings a metal bearing-plate as above described, having its recesses filled with lubricating material 5, (shown in solid black in the drawings,) is inclosed in a suitable casing, as the hub of a loose pulley, or a plumber-block or hanger, or a socket adapted to be fitted in such or analogous devices, and may be employed either singly or in combination with one or more similar plates abutting at their sides one against another and fitting in a common inclosing-casing; and in some instances it may be desirable to alternate plain bearing-plates, or plates unprovided with recesses containing lubricant, with the plates 1, before described.

Figure 8:
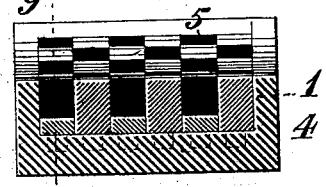

Figs. 5 and 6 illustrate a cylindrical bearing or bushing composed of a series of bearing-plates, 1, the recesses of which are packed with a lubricant filling, 5, and which are placed side by side and united by and inclosed within a casing, 4, cast around their peripheries and around the outer sides of the end plates of the series. The projections 3 of the plates are embedded in and the plates thereby firmly held by the metal of the casing, and the lubricant 5 is incased on every side except on the bearing-surface. The plates are by preference arranged, as shown, so that the filling of each recess shall abut against the metal between the recesses on the adjacent plates, and the metal and lubricant are thereby disposed alternately throughout the area of the bearing-surface. A semi-cylindrical bearing of similar construction is shown in Figs. 7 and 8.

I am aware that journal-bearings having recesses filled with graphite, asbestus, or soft-metal alloys in their bearing-surfaces were known prior to my invention, and am further aware that a bearing having a continuous skeleton frame provided with openings for the reception of soft metal, and having a casing cast around its outer surface, is not new. I therefore disclaim, broadly, a graphite filling for a bearing, as also the combination, with a bearing, of a frame for containing a softer material.

I claim herein as my invention—

1. A metallic bearing-plate having a series of open-sided recesses adapted to receive a filling of lubricating material on its bearing-face, and a rib or projection on its opposite face, substantially as set forth.

2. The combination of a metallic bearing-plate having a series of open-sided recesses on its bearing-face, a filling of lubricating material inserted in said recesses, and an inclosing-casing, substantially as set forth.

3. The combination, in a bearing or bushing, of two or more metallic bearing-plates, each having a series of recesses in its bearing-face filled with lubricating material, said bearing-plates being united with their sides abutting one against the other, substantially as set forth.

4. The combination, in a bearing or bushing, of two or more metallic bearing-plates, each having a series of recesses in its bearing-face filled with lubricating material, said plates abutting at their sides, and an inclosing-casing cast around and uniting the bearing-plates, substantially as set forth.

CHARLES RICHARDS.

Witnesses:
    J. H. GORMAN,
    ED. A. CUSTER.